United States Patent [19]

Hunter

[11] Patent Number: 5,199,306

[45] Date of Patent: Apr. 6, 1993

[54] METHOD AND APPARATUS FOR METERING FLOW IN CLOSED CONDUITS THAT SURCHARGE

[76] Inventor: Robert M. Hunter, 320 S. Willson Ave., Bozeman, Mont. 59715

[21] Appl. No.: 614,292

[22] Filed: Nov. 16, 1990

[51] Int. Cl.$^5$ .............................................. G01F 1/44
[52] U.S. Cl. .................................... 73/861.63; 73/215
[58] Field of Search ..................... 73/215, 216, 861.63, 73/861.64

[56] References Cited

U.S. PATENT DOCUMENTS

| | | |
|---|---|---|
| 2,283,906 | 5/1942 | Bennett . |
| 2,872,810 | 2/1959 | Shaffer . |
| 3,427,878 | 2/1969 | Gerlitz et al. . |
| 3,719,081 | 3/1973 | Lynn et al. . |
| 3,774,645 | 11/1973 | Pompa . |
| 3,859,853 | 1/1975 | Khuzaie . |
| 4,095,466 | 6/1978 | Schontzler et al. . |
| 4,279,148 | 7/1981 | Fitzgerald . |
| 4,799,388 | 1/1989 | Hunter .................................. 73/215 |
| 4,896,542 | 1/1990 | Hunter .................................. 73/215 |

FOREIGN PATENT DOCUMENTS 1260808 2/1968 Fed. Rep. of Germany .

OTHER PUBLICATIONS

BIF Industries Technical Bulletin 110-P1, Aug. 1958, p. 17.
Harry G. Wenzel, Jr.—"Meter For Sewer Flow Measurement" From Journal of the Hydraulics Division, Jan. 1975, pp. 115–133.
Floyd A. Nagler—"New Flow Meter Uses Side Contractions Only".
George F. Smoot—"A Rainfall-Runoff Quantity-Quality Data Collection System" From Proceedings of a Research Conference, Aug. 1974.

Primary Examiner—Herbert Goldstein
Attorney, Agent, or Firm—Rosenblatt & Associates

[57] ABSTRACT

A method and apparatus for measuring flow in a closed conduit under both full and less than full conditions is disclosed. The method and apparatus incorporate a tubular Venturi metering device. The cross section of the throat of the device is configured relative to the upstream section of the meter so that the throat will fill with liquid substantially simultaneously with the upstream section's filling with liquid. The present method and apparatus incorporate an improved pressure transmitting and sensing means, a data logger/controller and a data converter. The pressure transmitting and sensing means is designed to overcome the limitations of prior art means of transmitting and sensing pressures. One embodiment involves using submersible sensors to measure invert liquid pressures and a single bubbler system to transmit the throat (reference) pressure to the ends of the sensor vents (in the instrument case), thus allowing differential pressures to be measured. A second design involves transmitting pressures from sensing diaphragms via liquid-filled capillaries to both the pressure and reference ports of each of two (submersible) pressure sensors. The data logger/controller is a conventional element programmed to accomplish its functions. The data converter includes a computer program needed to convert pressure data into flow rate data.

20 Claims, 6 Drawing Sheets

METHOD AND APPARATUS FOR METERING FLOW IN CLOSED CONDUITS THAT SURCHARGE

TECHNICAL FIELD

This invention relates to a method and apparatus for metering flow in closed conduits that surcharge and more particularly to a method and apparatus for collecting and manipulating pressure data and converting it to flow data.

BACKGROUND

Engineers and scientists are frequently charged with the task of metering liquid flows in closed conduits that surcharge. For example, sanitary sewers that carry wastewater from areas that experience severe infiltration/inflow during wet weather typically operate under surcharged conditions during rainfall events. Similarly, culverts under roadways and storm sewers often operate as partially full open channels during dry weather but operate as full pipes during wet weather.

Applicant has previously disclosed a novel meter capable of metering flows in pipes that surcharge in U.S. Pat. Nos. 4,799,388 and 4,896,542. The meter is also described in a report entitled: "The Flumeter TM: A New Tool for Wastewater Management" prepared for the U.S. Department of Energy Energy-Related Inventions Program by Yellowstone Environmental Science, Inc., Bozeman, Montana, May 1988.

The inventions disclosed in the above referenced documents rely on three conventional bubbler systems to transmit pressures produced by the primary element, a combination Venturi flume/Venturi tube of novel design, to two differential pressure sensing means in the secondary element or instrument. Alternatively, three piezoelectric pressure transducers may be used. With this option, electrical signals characterizing the pressures are transmitted to the secondary element.

Subsequent research has revealed that the disclosed pressure sensing methods have certain limitations. The three bubbler system has a higher power requirement than is desired for a portable flow meter. Furthermore, rapid increases in flow rates can cause momentary inaccuracies in pressure readings. The use of three submerged piezoelectric pressure transducers can also introduce inaccuracies because of the large range over which they must operate.

NATURE OF THE INVENTION

The present invention provides a method and apparatus for measuring flow in a closed conduit under both full and less than full conditions. The method and apparatus incorporate a tubular Venturi metering device. The cross section of the throat of the device is configured relative to the upstream section of the meter so that the throat will fill with liquid substantially simultaneously with the upstream section's filling with liquid. The method for designing the device so that this occurs is disclosed in the above-referenced patents and report.

The present method and apparatus incorporate an improved pressure transmitting and sensing means, a data logger/controller and a data converter. The pressure transmitting and sensing means is designed to overcome the limitations of the originally proposed means of transmitting and sensing pressures. Two embodiments are envisioned. One involves using submersible sensors to measure invert liquid pressures and a single bubbler system to transmit the throat (reference) pressure to the ends of the sensor vents (in the instrument case), thus allowing differential pressures to be measured. The second design involves transmitting pressures from sensing diaphragms via liquid-filled capillaries to both the pressure and reference ports of each of two (submersible) pressure sensors. This design would eliminate the bubbler mechanism. The data logger/controller is a conventional element programmed to accomplish its functions. The data converter includes a computer program needed to convert pressure data into flow rate data.

It is an object of the invention to provide an improved means of transmitting and sensing pressures produced by Applicant's tubular Venturi metering device. It is a further object of this invention to provide a computer program to operate a data logger/controller. Another object of the invention is to provide a computer program to convert the collected pressure data into flow rate data. Further objects and advantages of the invention will become apparent from a consideration of the drawings and ensuing description of it.

BRIEF DESCRIPTION OF THE DRAWINGS

These features will be better understood by reference to the accompanying drawings which illustrate presently preferred embodiments of the invention.

In the drawings.

DETAILED DESCRIPTION OF THE INVENTION

Figure 1:
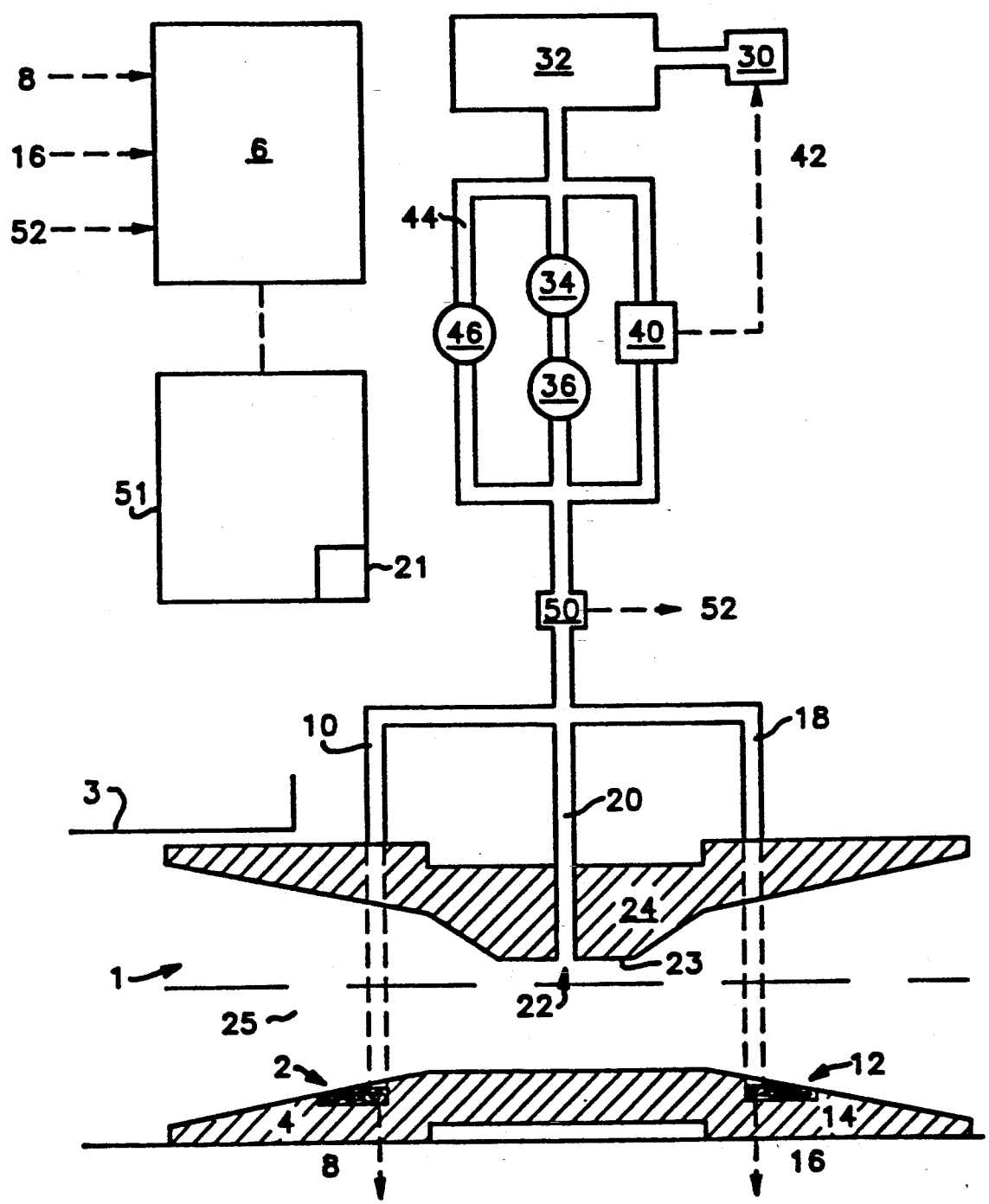
FIG. 1 is a schematic drawing of a first preferred embodiment of the pressure transmitting and sensing subassembly.
Figure 2:
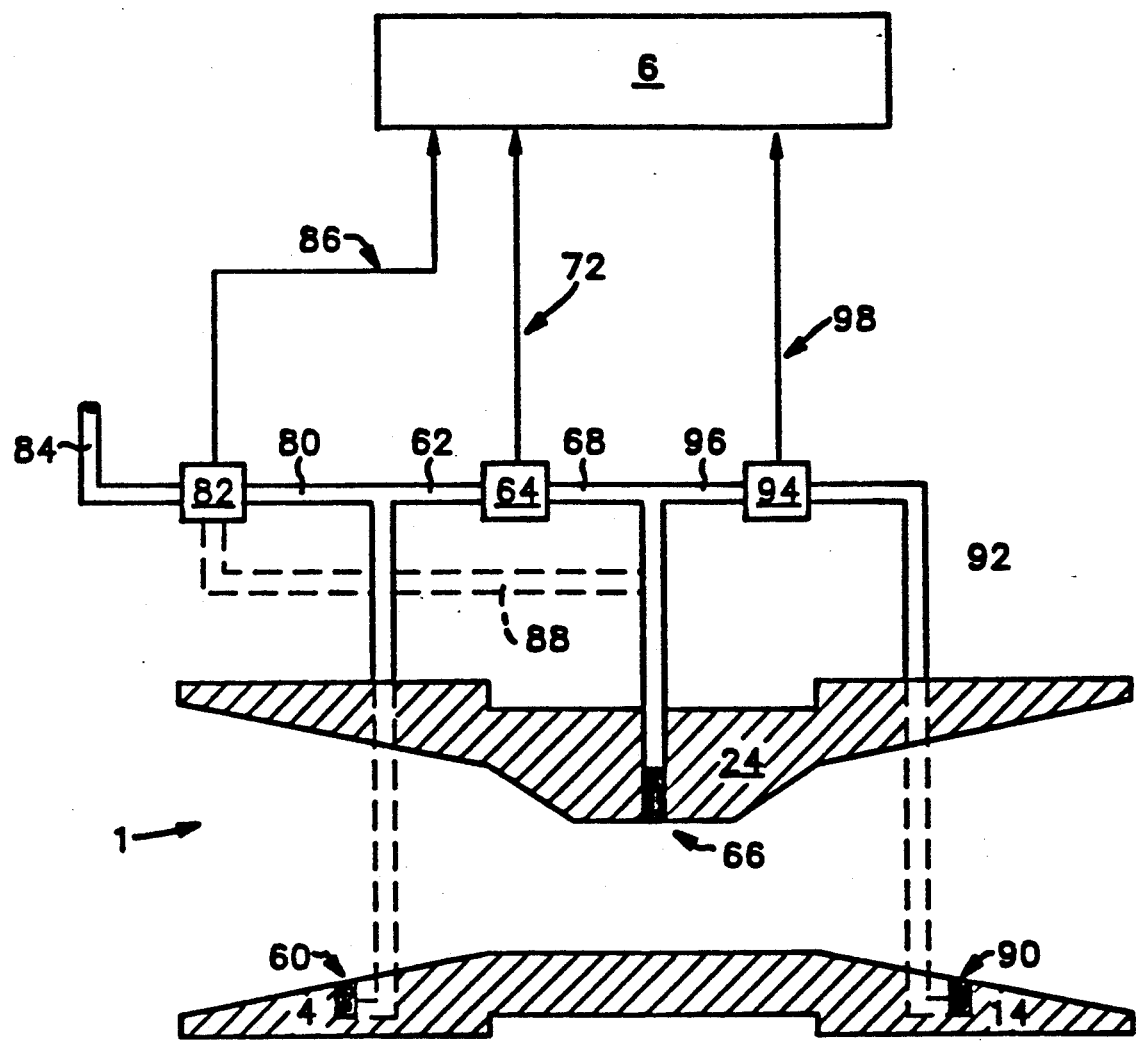
FIG. 2 is a schematic drawing of a second preferred embodiment of the pressure transmitting and sensing subassembly.

Referring to FIG. 1, a schematic diagram of a preferred embodiment of the pressure transmitting and sensing subassembly or means is presented. Means of transmitting air or fluid pressure, (e.g. tubing) are illustrated as solid lines. Means of transmitting electrical signals are illustrated as dashed lines. This embodiment and the embodiment shown in FIG. 2 are capable of metering forward and reverse flows in closed conduits that surcharge. They are also capable of metering full pipe flow and both free and submerged open channel flow. An example of a closed conduit that typically operates in these modes is a sanitary sewer that carries excessive infiltration and inflow.

It is noted that the embodiments of the primary element illustrated herein comprise a bottom and top sill or constriction. The patents and reports referenced above illustrate how the invention can be implemented with only side constrictions, provided that the top of the throat is flat.

Tubular Venturi metering device 1 having longitudinal axis 5 is installed in a closed conduit 3 to produce pressures at various locations in the device that are used to determine flow rate. The means by which this is accomplished is disclosed in the above-referenced patents. Differential pressure transducer or sensor 2 is attached to the entrance section 4 of the device 1 and may be a submersible pressure transducer. Sensor 2 produces an electrical signal that is transmitted to data logger/controller 6 via wires 8. Sensor 2 is referenced to a reference pressure via vent tube 10. Wires 8 and tube 10 may be incorporated into the lead used to supply power to sensor 2.

Differential pressure transducer or sensor 12 is attached to the exit section 14 of device 1 and may be a submersible pressure transducer. Sensor 12 also produces an electrical signal that is transmitted to data logger/controller 6 via wires 16. Sensor 12 is referenced to a reference pressure via vent tube 18. Wires 16 and tube 18 may be incorporated into the lead used to supply power to sensor 12.

One end of bubbler tube 20 is attached to port 22 located at the top 23 of the throat section 24 of device 1. Air in bubbler tube 20 escapes from port 22 in the form of bubbles when throat section 24 of device 1 is filled with liquid 25. The ends of tubes 10 and 18 are attached to bubbler tube 20. In this way, the pressure in bubbler tube 20 is the reference pressure for sensors 2 and 12.

Bubbler tube 20 is pressurized by air pump 30 which may introduce air directly into bubbler tube 20. In a preferred embodiment, air pump 30 is used to pressurize air tank 32. Discharge of air from air tank 32 into bubbler tube 20 is controlled by on/off valve 34 and by needle valve 36. On/off valve 34 is used to initiate and terminate bubbler tube pressurization. Needle valve 36 is used to vary the rate of bubble release through port 22. In this embodiment, pressure switch 40 senses the pressure in air tank 32 relative to the pressure in bubbler tube 20 downstream from needle valve 36. Thus, the pressure in bubbler tube 20 serves as the reference pressure for pressure switch 40. Pressure switch 40 is used to activate air pump 30 via conductor 42. In this way, the pressure in air tank 32 is controlled at a set pressure (e.g., 3.5 pounds per square inch) above the reference pressure in bubbler tube 20.

Purge tube 44 provides a bypass around on/off valve 34 and needle valve 36. Purge valve 46 on purge tube 44 is used to control purging activity. When purge valve 46 is open, the contents of air tank 32 are discharged into bubbler tube 20 and leaves bubbler tube 20 via port 22. Thus, by opening of purge valve 46, any liquid or solid that has entered bubbler tube 20 or that has partially blocked port 22 can be purged from the system.

Differential pressure sensor 50 is connected to bubbler tube 20 and is referenced (vented) to ambient air pressure. Thus, sensor 50 senses the pressure in bubbler tube 20 relative to ambient air pressure. Sensor 50 produces an electrical signal that is transmitted to data logger/controller 6 via wires 52.

Also shown on FIG. 1 is a portable computer 51 comprising a central processing unit having memory 21. Data logger/controller 6 may be interrogated by computer 51 in which data conversion is accomplished.

An alternative embodiment of the device to that shown in FIG. 1 is appropriate for closed conduits that do not surcharge because the flow or conduit is choked or flooded out downstream from the metering location. One example of such a situation would be at the end of a storm drain that discharges into a river above the high water level. Another example would be at the end of the conduit that serves as a dam spillway wherein the discharge is a free jet. In this embodiment, no differential pressure transducer or sensor 12 is provided. The only differential pressure transducer or sensors required are upstream sensor 2 and throat top sensor 50. A downstream sensor is not required because neither reverse flow nor submerged operation (over the modular limit of the device) can occur.

A second preferred embodiment of the pressure transmitting and sensing subassembly or means is presented in schematic form in FIG. 2. Diaphragm 60 is attached to the entrance section 4 of tubular Venturi metering device 1, and, preferably, to the invert (bottom) of entrance section 4. Pressure imposed on diaphragm 60 is transmitted via capillary tube 62 to the pressure side of differential pressure sensor 64. Diaphragm 66 is attached to the top of throat section 24 of device 1. Pressure imposed on diaphragm 66 is transmitted via capillary tube 68 to the reference side of differential pressure sensor 64. Sensor 64 produces an electrical signal that is transmitted to data logger/controller 6 via wires 72. Wires 72 may be incorporated into the lead used to supply power to sensor 64.

Pressure imposed on diaphragm 60 is also transmitted via capillary tube 80 to the pressure side of pressure sensor 82. Pressure sensor 82 is referenced (via vent 84) to ambient air pressure. Sensor 82 produces an electrical signal that is transmitted to data logger/controller 70 via wires 86. Wires 86 and vent 84 may be incorporated into the lead used to supply power to sensor 82.

In the preferred embodiment, diaphragm 90 is attached to the exit section 14 of device 1, and, preferably, to the invert of exit section 14. Pressure imposed on diaphragm 90 is transmitted via capillary tube 92 to the pressure side of differential pressure sensor 94. Pressure imposed on diaphragm 66 is also transmitted via capillary tube 96 to the reference side of differential pressure sensor 94. Sensor 94 produces an electrical signal that is transmitted to data logger/controller 70 via wires 98. Wires 98 may be incorporated into the lead used to supply power to sensor 94.

In an alternative embodiment (shown as dotted lines on FIG. 2), capillary tube 80 is not provided. Instead, pressure imposed on diaphragm 66 is also transmitted via capillary tube 88 to the pressure side of pressure sensor 82, which operates as noted above.

Figure 3:
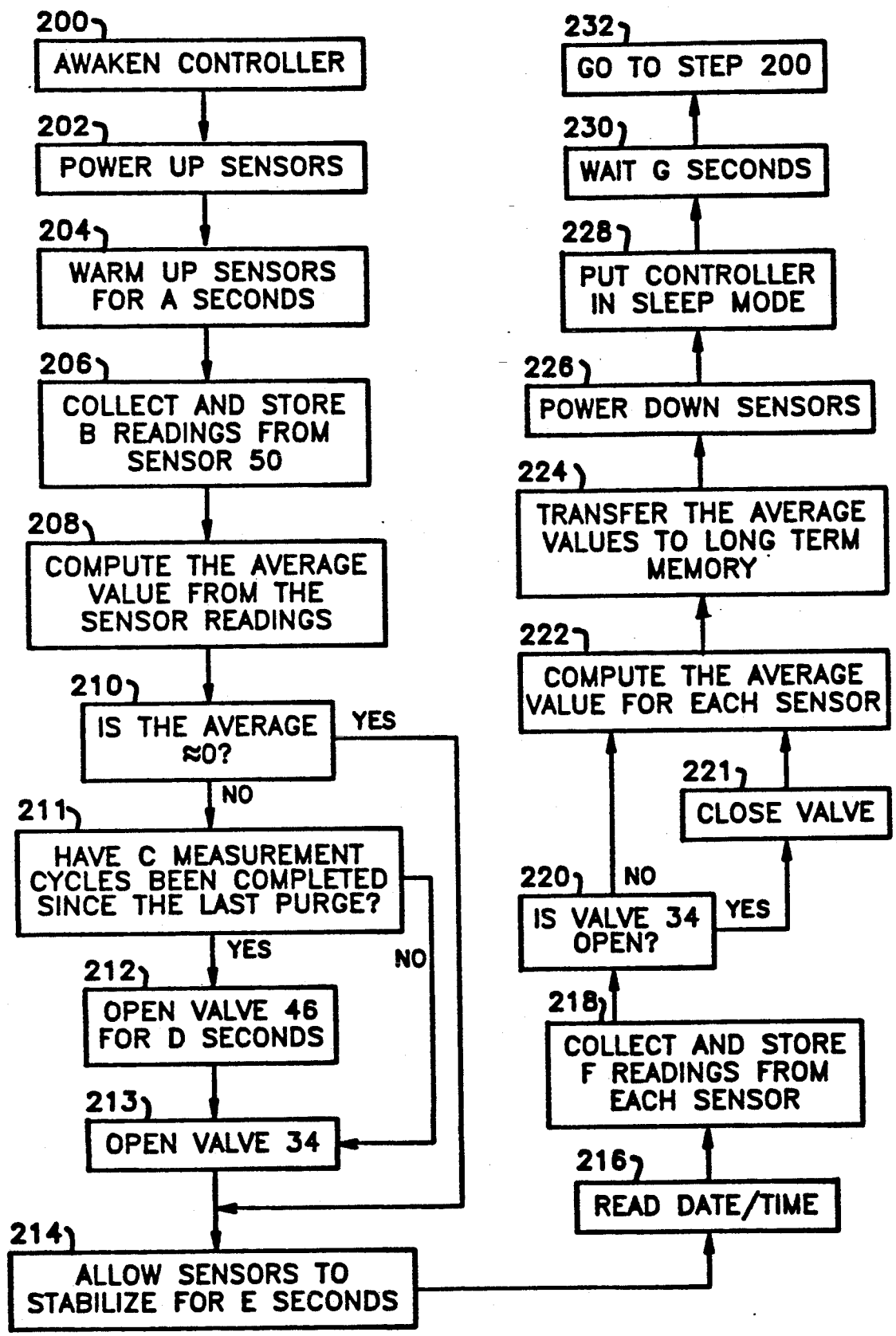
FIG. 3 is a block diagram of a preferred method of operation of the logger/controller element of the invention.

Referring to FIG. 3, a block diagram is presented of a preferred method of operation of the logger/controller element of the invention. In one preferred method, pressure sensors 2, 12 and 50 are involved. Initially, at step 200, the logger/controller is "awakened", that is, switched from a low power consumption mode to an active mode. Awakening occurs at a preselected (preprogrammed) sampling frequency, e.g., every five minutes. At step 202, first, second and third differential pressure sensors 2, 12 and 50 are activated by energizing them with electricity. The output of sensors 2, 12 and 50 are allowed to settle and reach relatively consistent values during step 204. At step 206, the output of sensor 50 is sampled for about 10 seconds. During sampling, the sensor output values that occur during short periods (lasting about 3 microseconds) is placed in a temporary memory. These output values are averaged at step 208 to produce an average value. At step 210, the average value is compared to the value zero. If the average value is approximately zero (indicating that sensor 50 is sensing ambient air pressure), the next step is step 216. If not, at step 211, a check is made to determine the number of measurements which have been made since the previous high pressure purging of the bubbler tube. If a (predetermined) sufficient number of cycles have occurred, purge valve 46 is opened for a set time interval in step 212. If not, the next step is 213. At step 213, the controller sends a signal to valve 34 causing it to open. When valve 34 is open, bubbler tube 20 is pressurized. At step 214, the outputs of sensors 2, 12 and 50 are allowed to settle and reach a relatively consistent value. The date and time exhibited by the internal clock of the logger/controller is read at step 216. At step 218, the outputs of sensors 2, 12 and 50 are sampled and averaged over a preselected (preprogrammed) sampling period, e.g., for one minute. At step 220, if valve 34 is open, the controller sends a signal to valve 34 causing it to close. The sampled output values are averaged at step 222 to produce average values. At step 224, the average output values and the date/time value are placed in the long-term logger memory. At step 226, the sensors are switched off. At step 228, the logger/controller is "put to sleep," that is, it is switched from an active mode to a low power mode to conserve energy. At step 230, the data logger/controller is kept in sleep mode for a fixed (predetermined) time interval. At step 232, the program returns to step 200 to begin another measurement cycle.

In an alternative embodiment of the method of operation of the logger/controller element of the invention, pressure sensors 64, 82 and 94 are involved. The method is the same as the previously disclosed method except that these sensors are used instead of sensors 2, 12 and 50.

It will be apparent to those skilled in the art that the preferred method of operation of the logger/controller element is not the only possible such method. For example, in some situations, wherein energy conservation is not required, the unit need not be switched between an active mode and a low power mode. Furthermore, the order of the steps may be changed (e.g., when the date/time is read) or some steps may be deleted (e.g., eliminate the value averaging steps).

Figure 4A:
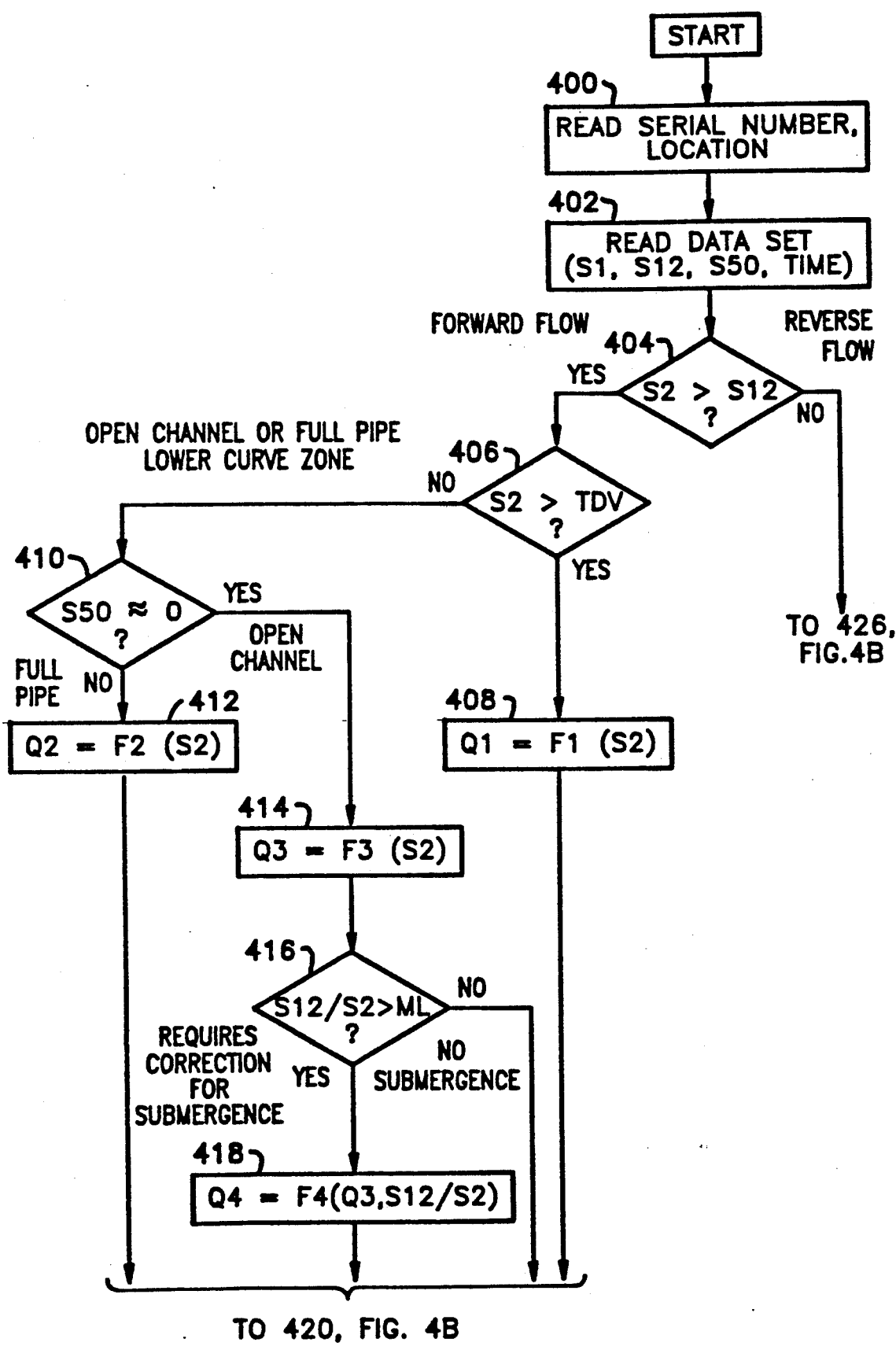
FIGS. 4a and 4b are a block diagram of a preferred method of operation of the data converter.
Figure 4B:
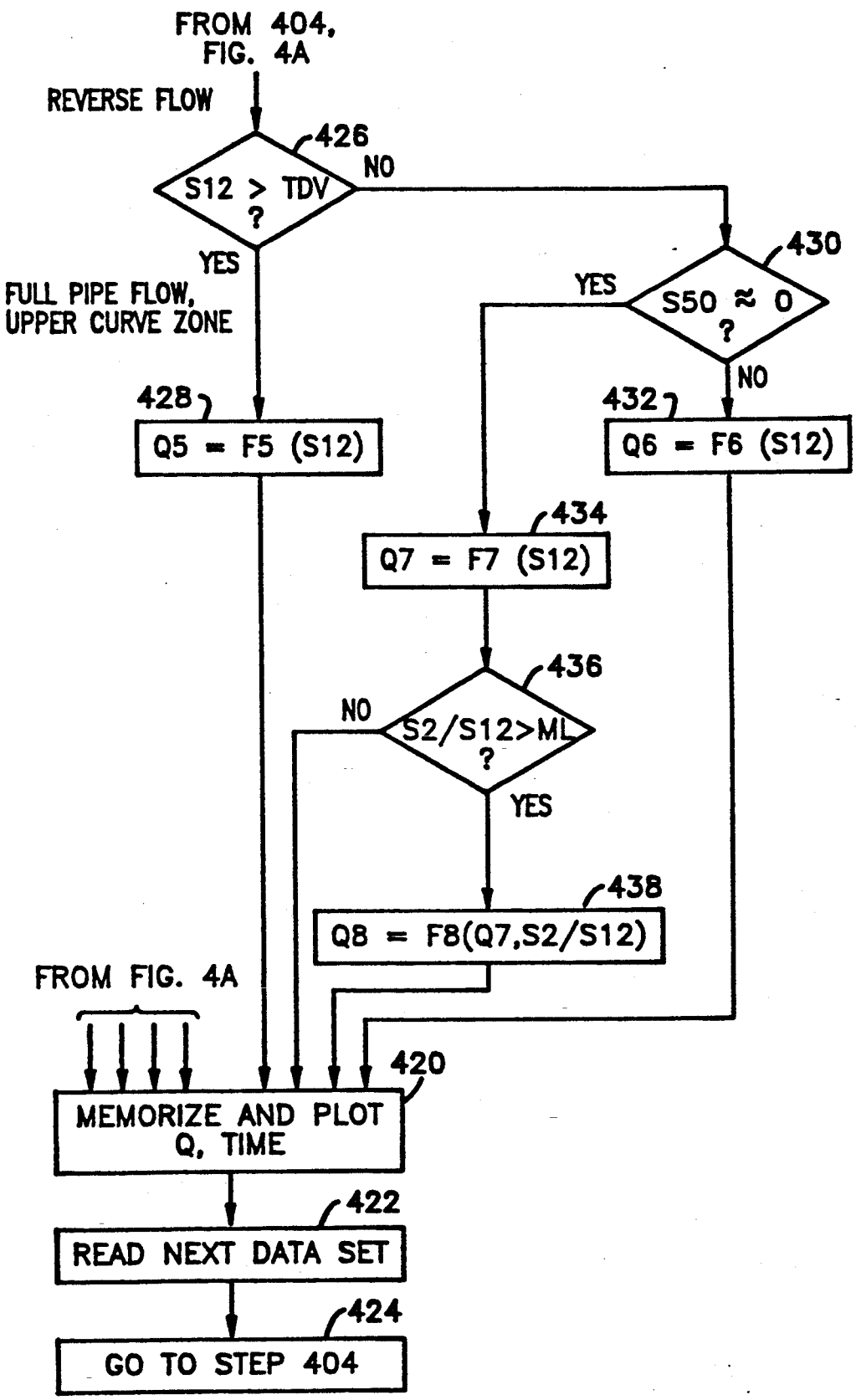

Referring to FIGS. 4a and 4b, a block diagram is presented of a preferred method of operation of the data converting element of the invention. In a preferred embodiment, data conversion is accomplished by means of a computer program resident in a portable (hand-held or lap top) computer. Alternatively, a program for data conversion may be resident in the central processing unit of the data logger/controller element. For the purposes of this disclosure, it is assumed that the program is resident in a water-tight portable computer that is used to interrogate the data logger/controller memory.

Initially, at step 400, the data converter reads the meter serial number and location. These data will have been input to the data logger/controller previously. At step 402, the data logger/controller is interrogated, that is, the following data value sets are read for each date/time:
Sensor 2 output value
Sensor 12 output value
Sensor 50 output value
It will be apparent that the data sets would consist of the values of sensors 64, 82 and 94 with the alternative embodiment described above. The example described below uses sensor 2, 12 and 50 output values. In any event, the stored output pressure values for each sensor are transferred from the memory of the data logger/controller to the memory of the data converter.

Figure 5:
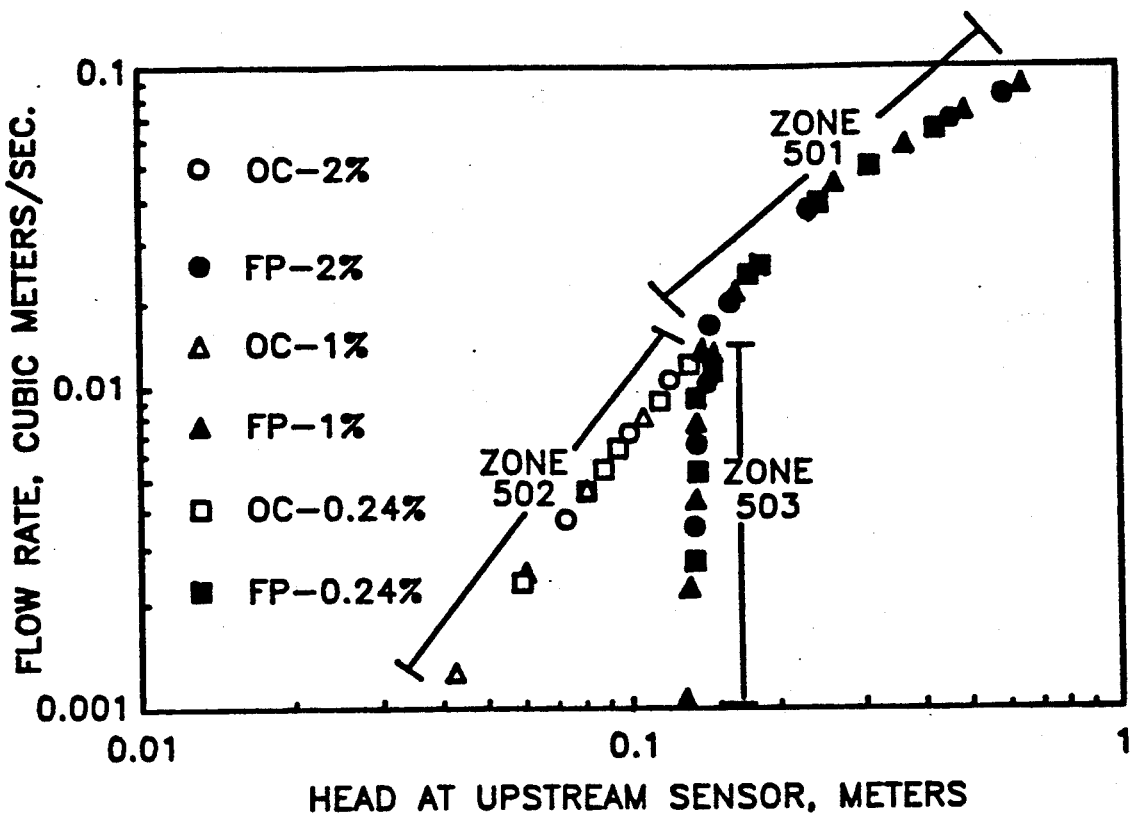
FIG. 5 presents calibration curves for the meter.

The remaining steps in the method are performed sequentially on each data set (each set of three values). At step 404, the direction of flow through the primary element is determined by comparing the values from sensor 2 (S2) and sensor 12 (S12). By this means, a determination is made of which of the first and second differential pressure sensors is upstream from the other. If S2 is greater than S12, the flow direction is forward, and the program advances to step 406. At step 406, S2 is compared to the pressure which occurs when the throat just fills with the liquid being metered (the throat depth value, TDV). If S2 is greater than the TDV, the flow condition is forward direction, full pipe, upper curve zone (FIG. 5, zone 501). The next step is 408, wherein flow rate Q1 is determined from function F1, with S2 as the independent variable and Q1 as the dependent variable.

The functions F1, F2, F3, F4, F5, F6, and F7 discussed herein may consist of either algorithms or look-up tables. For the purposes of this disclosure, the means of relating pressure sensor output values to flow rates comprise the calibration curves shown in FIG. 5 and the correction curves shown in FIG. 6. A 10-inch (diameter) meter size was used to produce the data upon which the curves were based. The curves in FIG. 5 comprise a first lower zone 502, a second lower zone 503 and an upper zone 501. In the embodiment disclosed herein, the same curves are used for forward and reverse flow. In FIG. 5, the open data points represent data values corresponding to open channel free flow, i.e., flows occurring when the throat of the primary element is not filled, and the upstream flow depth is not affected by submergence (i.e., downstream tailwater levels do not exceed the modular limit of the device). The solid data points represent values corresponding to full pipe flow, i.e., flows occurring when the throat of the primary element is filled. To produce FIG. 5, sensor outputs were obtained at three different pipe slopes (the slope, in percent, of the axis of the pipe with respect to the horizontal). In FIG. 5, data collected at slopes of 0.24%, 1%, and 2% are represented by data point squares, triangles, and circles, respectively.

Figure 6:
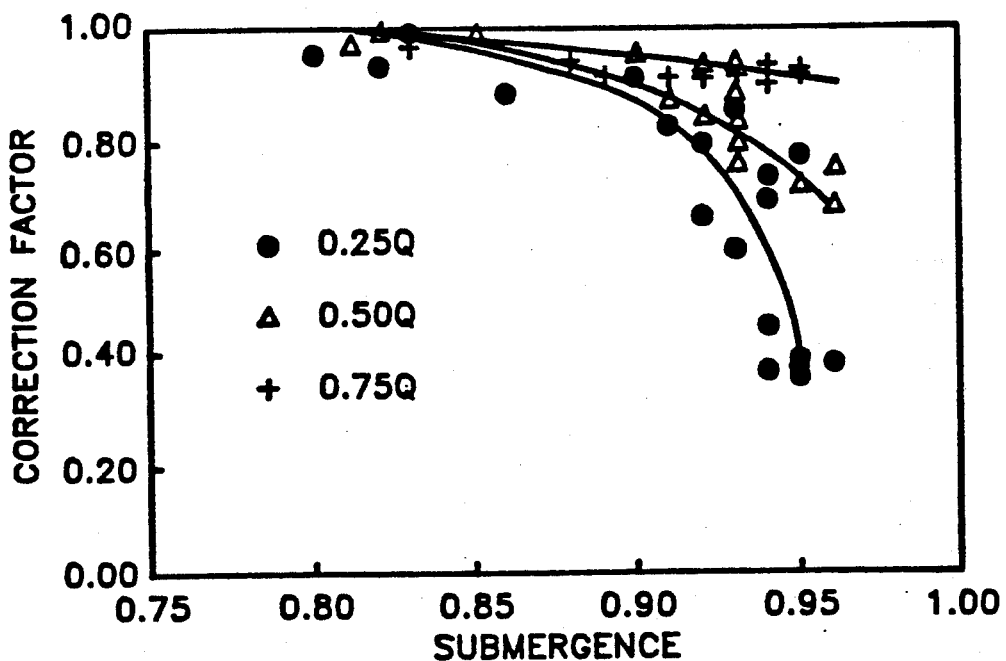
FIG. 6 presents correction factor curves for submerged operation of the meter.

Data shown on FIG. 6 were collected at various flow rates, with each flow rate defined as a certain proportion of the full gravity (open channel) flow capacity (Q) of the primary element. The circle, triangle and plus sign data points correspond to flow rates of 0.25Q, 0.5Q, and 0.75Q, respectively.

The next step is 420, where the computed flow rate is plotted versus the time of data collection, and written into memory. The program then advances to step 422, wherein the next set of data values are read from memory. The program then returns to step 404, and a new flow rate is calculated from the new data values.

If S2 is less than the TDV at step 406, the next step is 410, where the value of the throat sensor 50 (S50) is compared to zero. If S50 is approximately equal to zero (plus or minus 0.1 pounds per square inch), the flow condition is forward direction, open channel flow. The next step is 414, wherein preliminary flow rate Q3 is computed from function F3, with S2 as the independent variable and Q3 as the dependent variable. The next step is 416, wherein the ratio S12/S2 is compared to the maximum submergence (i.e., the modular limit, ML). If S12/S2 is less than the ML, the flow condition is forward direction, open channel free flow (FIG. 5, zone 502), and the program advances to step 420.

If the ratio S12/S2 is greater than the ML at step 416, the flow condition is forward direction, open channel submerged flow. The next step is 418, where flow rate Q4 is computed from function F4. F4 is an iterative process that uses both the calibration curves and the correction curves. An initially corrected flow rate Q4 is calculated by multiplying Q3 by a correction factor derived from the correction curve on FIG. 6. This correction factor is a function of both Q3 and the ratio S2/S12. The initially computed value of Q4 is used to determine a new correction factor, and a new value for Q4 is calculated by multiplying the old value of Q4 by the new correction factor. The process is repeated until consecutively calculated Q4 values converge and differ by less than one percent. The program then advances to step 420.

At step 410, if S50 is not approximately equal to zero, the flow condition is forward direction, full pipe flow and the lower curve zone (FIG. 5, zone 503) is used. The next step is 412, wherein flow rate Q2 is computed from function F2, with the differential entrance to throat pressure value S2 as the independent variable, and Q2 as the dependent variable. The program then advances to step 420.

If S12 is greater than S2 at step 404, the flow direction is reverse, and the program advances to step 426, wherein S12 is compared to the TDV. If S12 is greater than the TDV, the flow condition is reverse direction, full pipe flow and upper curve zone (FIG. 5, zone 501) is used. The next step is 428, wherein flow rate Q5 is computed from function F5, with S12 as the independent variable and Q5 as the dependent variable. The program then advances to step 420.

If S12 is less than the TDV in step 426, the next step is 30, where S50 is compared to zero. If S50 is approximately equal to zero (plus or minus 0.1 pounds per square inch), the flow condition is reverse direction, open channel flow. The next step is 434, wherein the preliminary flow rate Q7 is computed from function F7, with S12 as the independent variable and Q7 as the dependent variable. The program advances to step 436, wherein the ratio S2/S12 is compared to the ML. If the ratio S2/S12 is less than the ML, the flow condition is reverse direction, open channel free flow, and the lower curve zone (FIG. 5, zone 503) is used. The program then advances to step 420.

If the ratio S2/S12 exceeds the ML in step 436, the flow condition is reverse direction, open channel submerged flow. The next step is 438, wherein flow rate Q8 is computed by means of iterative function, F8. In F8, an initially corrected value for Q8 is calculated by multiplying Q7 by a correction factor. This correction factor is a function of Q7 and the ratio S2/S12. The initial value of Q8 is used to determine a new value for the correction factor, and a new value of Q8 is calculated by multiplying the old value of Q8 by the new correction factor. This process is repeated until consecutively calculated values of Q8 converge to within one percent. The program then advances to step 420. When all the data sets have been converted to flow rates, the program stops at step 422.

The algorithms or look-up tables used in the flow rate calculations may be the same for both forward or reverse flow conditions with some meter designs. The modular limits for forward and reverse flow may also be the same. If the meter is installed in the entrance sewer of a sewer manhole and discharges into the unconfined (open) conduit in the manhole, different algorithms or look-up tables may be required for forward and reverse flow conditions. If reverse and/or submerged flow conditions would not occur, those steps may be eliminated from the program.

Many variations of the invention will occur to those skilled in the art. All such variations within the scope of the claims are intended to be within the scope and spirit of the invention.

I claim:

1. An apparatus for metering liquid flow in a closed conduit that surcharges comprising:
    a tubular Venturi metering device having a longitudinal axis, an entrance section, and a throat section having a top,
    first pressure sensing means for sensing the pressure in said entrance section referenced to the pressure at said throat top, said first means attached to said device, for producing an electrical output that characterizes the pressure that said first means senses,
    second pressure sensing means for sensing the pressure in said throat referenced to ambient air pressure, said second means attached to said apparatus for producing an electrical output that characterizes the pressure that said second means senses; and
    means for computing the flow rate through the apparatus using said electrical outputs.

2. An apparatus for metering liquid flow in a closed conduit that surcharges comprising:
    a tubular Venturi metering device having a longitudinal axis, an entrance section, a throat section having a top that is flat, and an exit section,
    first differential pressure sensing means capable of sensing the difference in pressure between said entrance section and said throat top, said first means attached to said device, and capable of producing an electrical output that characterizes the pressure that said first means senses,
    second differential pressure sensing means capable of sensing the difference in pressure between said exit section and said throat top, said second means attached to said device and capable of producing an electrical output that characterizes the pressure that said second means senses,
    said device installed in said conduit so that both said longitudinal axis and said top are horizontal and said liquid is required to flow through said device,
    third differential pressure sensing means capable of sensing the difference in pressure between said throat top and ambient air pressure, said third means attached to said apparatus and capable of producing an electrical output that characterizes the pressure that said third means senses,
    storing the outputs of said first, second and third differential pressure sensing means, and
    means for converting said outputs to flow data.

3. The apparatus of claim 2 wherein the entrance section is axially inwardly tapered.

4. The apparatus of claim 2 wherein the exit section is axially outwardly tapered.

5. The apparatus of claim 2 wherein
    said first differential pressure sensing means is a first submersible pressure transducer,
    said second differential pressure sensing means is a second submersible pressure transducer,
    said third differential pressure sensing means is comprised of a pressure sensor having a reference side vented to the atmosphere, a bubbler tube for transmitting the pressure at the top of said throat section to said pressure sensor and a means for pressurizing said bubbler tube, reference sides of said first and second submersible pressure transducers being vented to said bubbler tube.

6. The apparatus of claim 5 wherein said means for pressuring said bubbler tube comprises an air pump.

7. The apparatus of claim 6 wherein said means for pressurizing said bubbler tube further comprises:
an air tank pressurized by said air pump,
a first valve to control the rate of discharge of air into said bubbler tube,
a bypass around said first valve, said bypass having a second valve,
said second valve capable of automatic actuation to purge said bubbler tube, and
a pressure switch capable of sensing the difference between the pressure in said bubbler tube downstream of said first valve and the pressure in said air tank and actuating said air pump when said difference falls below a preset value.

8. A method for metering liquid flow in a closed conduit that surcharges comprising the steps:
installing a tubular Venturi metering device in said conduit,
said device having a longitudinal axis, an axially inwardly tapered entrance section, a throat section having a top that is flat, and an axially outwardly tapered exit section,
said device installed in said conduit sot hat both said longitudinal axis and said top are level and said liquid is required to flow through said device,
sensing the difference in pressure between said entrance section and said throat top with first differential pressure sensing means, said first means attached to said device and capable of producing an electrical output that characterizes the pressure that said first means senses,
sensing the difference in pressure between said exit section and said throat top with second differential pressure sensing means, said second means attached to said device and capable of producing an electrical output that characterizes the pressure that said first means senses,
sensing the difference in pressure between said throat top and ambient air pressure with third differential pressure sensing means, said third means attached to said apparatus and capable of producing an electrical output that characterizes the pressure that said third means senses,
storing the outputs of said first, second and third differential pressure sensing means, and
converting said outputs to flow data.

9. The method of claim 8 wherein storing is accomplished by a logger/controller, said logger/controller having a method of operation comprising the steps:
switching said logger/controller from a low power consumption mode to an active mode,
activating said first, second and third differential pressure sensing means so that said first, second and third differential pressure sensing means produce output values,
waiting for at least the output values of said third differential pressure sensing means to settle,
sampling the output values of said third differential sensing means,
averaging the output values of said third differential pressure sensing means,
comparing the average output value of said third differential pressure sensing means to the value zero,
if the output value of said third differential pressure sensing means is not approximately zero, activating a means for transmitting the pressure at the top of said throat to a reference side of said first and second differential pressure sensing means, and waiting for the output values of said first, second and third differential pressure sensing means to settle,
reading a date and time value,
sampling the output values of said first, second and third differential pressure sensing means for a preselected sampling period,
if said means for transmitting is activated, deactivating said means for transmitting,
averaging the output values of said first, second and third differential pressure sensing means,
placing said average output values and said date and time value,
deactivating said first, second and third differential pressure sensing means, and
switching said logger/controller from an active mode to a low power consumption mode.

10. The method of claim 8 wherein said device has a throat depth value and a modular limit wherein converting said outputs to flow data is accomplished by a computer program operating in a computer having a memory, said computer program comprising means for relating said outputs to flow rates, and said computer program having a method of operation comprising the steps:
determining which of the first and second differential pressure sensors is upstream from the other, and, hence, the direction flow,
determining whether the output value of the upstream pressure sensor exceeds the throat depth value,
if the output value of the upstream pressure sensor does not exceed the throat depth value, determining whether the throat of said device is full of liquid,
if the output value of the upstream pressure sensor does not exceed the throat depth value and said throat is not full, determining whether the modular limit of said device is exceeded, and
calculating the flow rate by reference to said means for relating said outputs to flow rates.

11. The method of claim 10 wherein said means for relating said outputs to flow rates comprises calibration curves comprising two lower curve zones and an upper curve zone and wherein the upper curve zone is referred to if said upstream output value exceeds said throat depth value.

12. The method of claim 10 wherein said method of operation comprises the steps:
placing the calculated flow rates in the memory of said computer, and
plotting said flow rates versus time of collection of the output values upon which said flow rates are based.

13. An apparatus for metering liquid flow in a closed conduit that surcharges comprising:
a tubular Venturi metering device having a longitudinal axis, an entrance section, a throat section having a top, and an exit section, first pressure sensing means for sensing the pressure in said entrance section referenced to the pressure at said throat top, said first means attached to said device, for producing an output that characterizes the pressure that said first means senses, second pressure sensing means for sensing the pressure in said exit section referenced to the pressure at said throat top, said second means attached to said device for producing an output that characterizes the pressure that said second means senses, and third pressure sensing means for sensing the pressure in said throat with respect to ambient air pressure, said third means attached to said apparatus for producing an output that characterizes the pressure that said third means senses.

14. The apparatus of claim 13 wherein said first pressure sensing means is a first submersible pressure transducer, said second pressure sensing means is a second submersible pressure transducer, said third pressure sensing means is comprised of a pressure sensor having a reference side vented to the atmosphere, a bubbler tube for transmitting the pressure at the top of said throat section to said pressure sensor and a means for pressurizing said bubbler tube, reference sides of said first and second submersible pressure transducers being vented to said bubbler tube.

15. The apparatus of claim 13 wherein;

said device has a throat depth value and a modular limit and further comprising:

computer means for receiving said outputs and relating said outputs to flow rates, said computer means further determining from output values of the first and second pressure sensors which of the first and second pressure sensors is upstream from the other, and, hence, the direction of flow, and whether the output value of the upstream pressure sensor exceeds the throat depth value, whereupon if the output value of the upstream pressure sensor does not exceed the throat depth value, said computer means determines whether the output value of the throat sensor is within a predetermined range from zero indicating the throat of the device is not full of liquid, and if outside such range, indicating the throat of said device is full of liquid; and said computer means further calculating the flow rate by reference to said means for relating said outputs to flow rates.

16. The apparatus of claim 15 wherein:

said computer means further comprises application of calibration curves, stored in said computer means, based on said measured outputs comprising two lower curve zones and an upper curve zone, each relating flow rates to pressure, wherein the upper curve zone is referred to if said upstream output value exceeds said throat depth value, and wherein a first one of the lower curve zones is referred to if said throat is not full and a second one of the lower curve zones is referred to if said upstream value does not exceed said throat depth value and said throat is full.

17. The apparatus of claim 16 wherein:

said computer means comprises a determination of whether the output value of the upstream pressure sensor does not exceed the throat depth value and said throat is not full, relating the output values of the upstream and downstream pressure sensors to determine whether the modular limit of said device is exceeded, said calibration curves including curves relating a correction factor to submergence for use to correct flow rates when said throat is not full and said modular limit is exceeded.

18. A method for metering liquid flow in a closed conduit that surcharges, comprising the steps:

installing a tubular Venturi metering device in said conduit, said device having a longitudinal axis, an axially inwardly tapered entrance section, a throat section having a throat top and throat depth value, and an axially outwardly tapered exit section, said device installed in said conduit so that said liquid is required flow through said device, determining the difference in pressure between said entrance section and said throat top by means of at least first pressure sensing means, said first pressure sensing means producing an output value that characterizes the pressure that said first means senses, determining the difference in pressure between said exit section and said throat top by means of at least second pressure sensing means, said second pressure sensing means producing an output value that characterizes the pressure that said second means senses, sensing the difference in pressure between said throat top and ambient air pressure with a third pressure sensing means, said third pressure sensing means producing an output value that characterizes the pressure that said third means senses, determining from output values of said first and second pressure sensing means which of the first and second pressure sensors is upstream form the other, and, hence, the direction of flow, determining whether the output value of the upstream pressure sensor exceeds the throat depth value, if the output value of the upstream pressure sensor does not exceed the throat depth value, determining whether the output value of the throat sensor is within a predetermined range from zero indicating the throat of the device is not full of liquid, and if outside such range, indicating the throat of said device is full of liquid, and calculating the flow rate by reference to said means for relating said outputs to flow rates.

19. The method of claim 18 wherein said means for relating said outputs to flow rates comprises calibration curves comprising two lower curve zones and an upper curve zone each relating flow rates to pressure, wherein the upper curve zone is referred to if said upstream output value exceeds said throat depth value, and wherein a first one of the lower curve zones is referred to if said throat is not full and a second one of the lower curve zones is referred to if said upstream value does not exceed said throat depth value and said throat is full.

20. The method of claim 18 wherein said device has a modular limit and further comprising relating the output values of said upstream and downstream pressure sensors to determine whether the modular limit of said device is exceeded if the output value of the upstream pressure sensors does not exceed said throat depth value and said throat is not full, and if said modular limit is exceeded, correcting the calculated flow rate to reflect a flow rate for the submergence of the device for the exceeded modular limit.

* * * * *